United States Patent [19]

Berlin

[11] 4,228,765
[45] Oct. 21, 1980

[54] RABBIT RESTRAINING BOX

[75] Inventor: Carter H. Berlin, Alta Loma, Calif.
[73] Assignee: Joseph B. Michaelson, Glendale, Calif.
[21] Appl. No.: 953,787
[22] Filed: Oct. 23, 1978
[51] Int. Cl.³ .......................... A61D 3/00; A01K 15/04
[52] U.S. Cl. ........................................ 119/98; 119/99; 119/103
[58] Field of Search ...................... 119/96, 98, 99, 103; 220/4 A, 4 B

[56] References Cited
U.S. PATENT DOCUMENTS

| | | | |
|---|---|---|---|
| 777,051 | 12/1904 | Underhill | 119/96 X |
| 2,498,051 | 2/1950 | Shipley | 119/99 A |
| 3,187,721 | 6/1965 | Cappel | 119/103 |
| 3,368,530 | 2/1968 | Bearss | 119/103 X |

Primary Examiner—Louis G. Mancene
Assistant Examiner—Robert P. Swiatek
Attorney, Agent, or Firm—Louis J. Bachand

[57] ABSTRACT

A rabbit restraining box apparatus having numerous advantageous features including a hinged securable cover for rabbit restraint and an adjustable length. A kick plate for contact with the feet of the rabbit's hind legs adjustable in height and position for rapid adjustment to individual rabbits inserted in the box and to facilitate flushing of the feces from the box is provided as is a rounded, cushioned and size-adjustable neck opening.

16 Claims, 6 Drawing Figures

U.S. Patent     Oct. 21, 1980     4,228,765
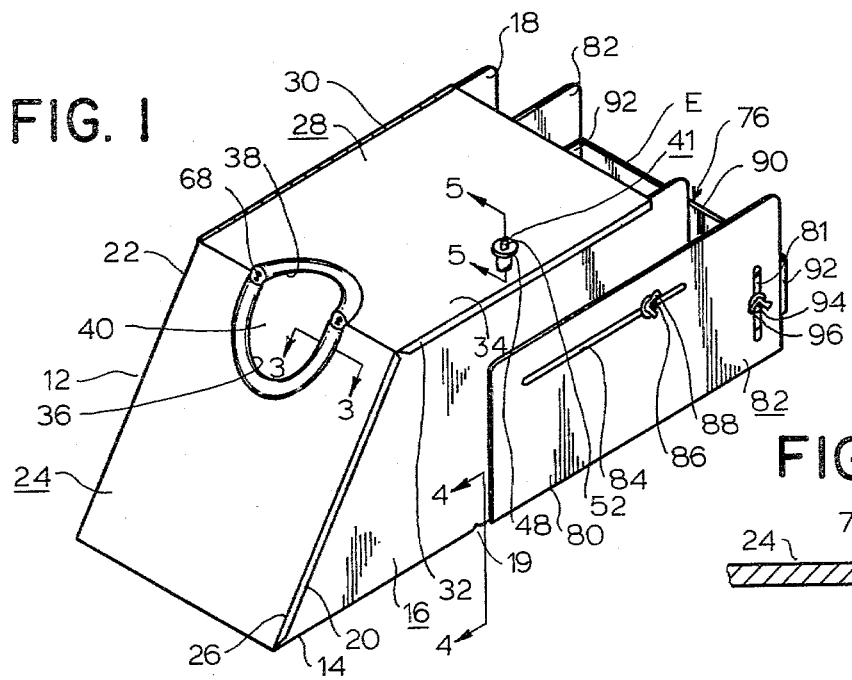
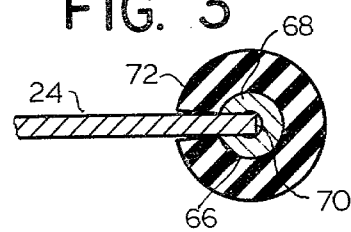
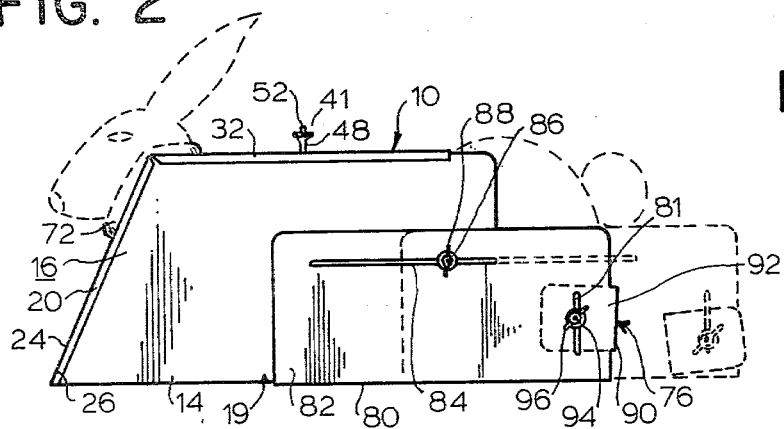
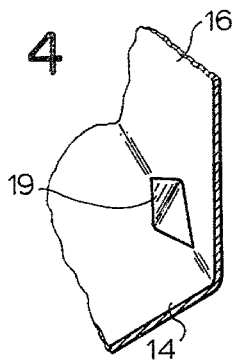
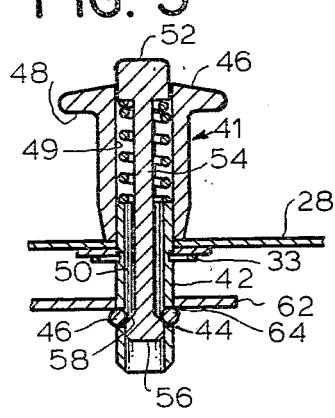
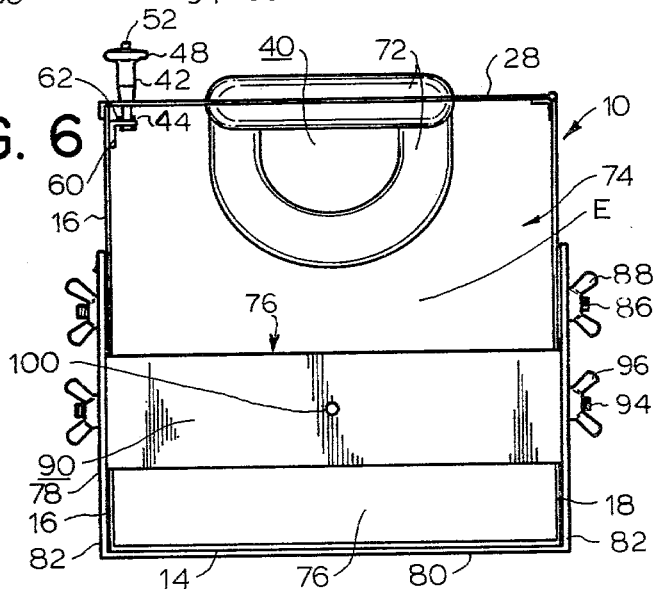

RABBIT RESTRAINING BOX

This invention has to do with rabbit restraining boxes and more particularly with an improved rabbit restraining box having numerous features providing the utmost in convenience to the laboratory user.

Rabbits are widely used as test animals for a variety of scientific and environmental purposes. Laboratory rabbits are treated with medicines and cosmetics, as well as numerous industrial chemicals to ascertain by analogy the potential health hazards in exposing humans to such medicines, cosmetics or industrial chemicals.

In many of these tests it is essential that the rabbit be prevented from undue activity so that accurate measurements may be made, for example, in pyrogen tests in which batches of pharmaceuticals are evaluated for safety by measuring temperature rise, it is the common practice to insert a rectal thermometer in the rabbit periodically over 3 hours, and naturally, during this period the rabbit must be restrained. Other tests such as those involving eye irritation values are most adequately carried out if a rabbit is unable to scratch or otherwise physically irritate the eye. Again, effective rabbit restraint is essential.

The volume of rabbit testing is increasing rapidly as regulations increase and checkpoints in the course of manufacture and design multiply. With the increasing sophistication of the tests, old-fashioned, or casually assembled rabbit restraining devices no longer meet the needs of large laboratory organizations.

For example, it is highly desirable to be able to mount batteries of rabbit restraining devices for ease of monitoring the rabbits. Insertion of the rabbit and restraining him within the box then becomes the problem if the restraining devices associated with the box are mounted on the sides of the box, where access is difficult. Larger scale tests require that the rabbit be as quiet as possible, and for this purpose, boxes should be designed which are not frightening to the rabbit and which take advantage of the rabbit's natural tendency to be quiescent when properly accommodated. Ease of cleaning batteries of rabbit boxes is highly important obviously.

SUMMARY OF THE INVENTION

It is accordingly, a major objective of the present invention to provide an improved rabbit restraining box. It is more particularly the object of the invention to provide a rabbit box which has an improved rabbit restraining feature, which is operated from the top of the box, positive in action, and readily maintained in an available state; which has a cushioned and size-adjustable neck opening to accommodate various sizes of rabbits without complicated equipment adjustment, which has a length adjustable feature to accommodate various sizes of rabbits comfortably, and which provides a back plate against which the feet of the rabbit's hind legs may rest, reassuring the rabbit and enhancing its quiescence during periods of restraint and having two independent means of length adjustability for readily accommodating various lengths of rabbits, and which is height adjustable to accommodate the rabbit's size and also to permit ready flushing of the box after use, with an absence of crevices, corners and other dead spots for accumulation of debris. Accordingly, and for the purpose of accomplishing the foregoing and other objectives of the invention to become apparent hereinafter, there is provided a rabbit box apparatus for laboratory rabbits comprising a box having: a bottom wall; a pair of opposed side walls; and a front wall having a rabbit neck-receiving opening, the front wall being connected to the bottom and side walls to define a rabbit enclosure; a top wall hinged to one of the side walls to open or close the enclosure in rabbit-receiving and restraining relation respectively; and a box back plate means for engaging the hind leg feet of the rabbit restrained in the box, the back plate means including a bar extending transversely of the enclosure opposite the front wall, and positioning means adjustably securing the bar to the box walls for rabbit foot engagement. The top wall and front wall may cooperatively define the mentioned neck-receiving opening, the front wall typically being fabricated of a single thickness of rigid metal about the neck-receiving opening and the apparatus including also a rounded bead formed on the edge of the opening against rabbit neck injury. There is further provided an elastomeric collar insert separably securable to the bead in opening size-reducing relation. In preferred embodiments of the apparatus the top wall and the front wall cooperatively define the neck-receiving opening, the top wall and front wall each being fabricated of the single thickness of rigid metal above the neck opening, the rounded bead extends about the perimeter of the opening and the apparatus further includes an elastomeric collar insert separably securable to the bead in opening size-reducing relation.

The apparatus further contemplates provision of latch means for securing the box top wall to the other of the side walls, the latch means typically comprising a keeper pin-hole mounted on the other side wall, and a latch pin carried by the side wall in keeper-interfitting relation, the latch pin carrying detent means for selectively locking or not locking the top wall to the other side wall upon registry of the pin and pin-hole keeper. The mentioned detent means may comprise a ball movably carried within the pin, and there may be provided a ball actuator button carried by the latch pin in detent ball-controlling relation.

The mentioned back plate positioning means typically comprises a three sided frame longitudinally interfittingly congruent with the box bottom and side wall. The apparatus further includes fasteners securing the frame to the box walls in bar positioning and enclosure extension delimiting relation. The frame may be adjustable relative to the fasteners for selectively repositioning the frame in rabbit enclosure longitudinal dimension-adjusting relation i.e., to vary the enclosure length. The transverse bar typically is adjustably carried by the frame and comprises a U-shaped member having a base and ears upstanding on opposite ends of the base, the frame having bar mounting means opposite the bar ears including adjustable fasteners cooperating with said mounting means to secure the bar to the frame in adjustable relation.

In such other embodiments of the invention, the bar may be alternately positionable within the frame by pivoting about the locus of the fasteners, the mounting means comprising vertically extended slots in which the fasteners are variably positionable in bar raising and lowering relation relative to the frame.

As in previously discussed embodiments, this just-mentioned embodiment may have the top wall and front wall of the box oppositely relieved to cooperatively define the neck-receiving opening, the front wall being fabricated of a single thickness of rigid metal about the neck opening and the apparatus further including a rounded bead formed on an edge of the opening against rabbit injury. The apparatus in these embodiments too, may include an elastomeric collar insert separably securable to the bead in opening size-reducing relation as well as the top wall and the front wall each being fabricated of a single thickness of rigid metal, and the apparatus further includes the rounded bead extending about the perimeter of the opening, the bead being adapted to mount the elastomeric collar insert in separably securable relation to reduce the size of the opening.

The latch means typically is included in these embodiments as well for selectively securing the top wall to the other of the side walls, such latch means comprising a keeper pin-hole carried on the other side wall and a latch pin carried by the top wall in keeper-interfitting relation, the latch pin carrying detent means for selectively locking or not locking the top wall to the other side wall in pin-hole registered condition, the detent means comprising a ball movably carried within the pin and a ball actuator button carried by the pin in detent ball-controlling relation.

In summary form, a preferred embodiment of the invention comprises a rabbit restraining apparatus for laboratory animals, the apparatus comprising a box and an adjustably interfitting frame defining a longitudinally variable rabbit enclosure. The box is typically formed of sheet metal shaped to define a bottom wall and an integral pair of opposed upstanding side walls having raked leading edges; the box further having a front wall secured to the bottom wall and to the side walls along the raked edges thereof; a top wall; the top wall and the front wall being cooperatively relieved to define a rabbit neck-receiving opening; rounded means lining the neck opening including a metal bead enclosing the opening edges on both sides thereof; the top wall being hinged along one longitudinal side margin to one of the side walls, the top wall having a downwardly directed flange at the other of its longitudinal side margins to interfit the opposite box side walls; latch means including a male latch element having a movable button and a detent ball actuable by the button, the male latch element being carried on the top wall inwardly adjacent the top wall flange, and a female latch element supported by the other box side wall registrable with the male latch element and adapted to receive the male latch element in detented locked or detented unlocked relation responsive to detent ball actuation by the movable button; the frame being formed of sheet metal into bottom and side walls congruent with corresponding box bottom and side walls; the frame side walls and box side walls carrying cooperating pin and slot means for guided longitudinal adjustment of the frame and box; fasteners securing the relative adjustment of the frame and box, the frame side walls having vertical slots beyond the box, and a transverse bar mounted on the frame side walls at the vertical slots; fastening means securing the bar to the frame side walls in vertically adjusted relation, the bar being pivotable in its vertically adjustable relation to delimit the longitudinal extent of the rabbit enclosure independent of the frame adjustment relative to the box.

In such embodiments the box may further be provided with longitudinally spaced upsets at the corner intersection of the box bottom wall and the box side walls, to rigidify the box. The mentioned transverse bar further may have a thermometer-passing aperture formed centrally thereof for connection of the thermometer into a rabbit's rectum during restraint of the rabbit in the apparatus.

BRIEF DESCRIPTION OF THE DRAWINGS

The invention will be further described as to an illustrative embodiment in conjunction with the attached drawings in which;

FIG. 1 is a perspective view of the apparatus of the invention;

FIG. 2 is a side elevation thereof;

FIG. 3 is a fragmentary detail view, enlarged, of the neck protective opening lining of the invention, taken on line 3—3 in FIG. 1;

FIG. 4 is a fragmentary detail view, enlarged, of the box corner rigidifying upset, taken on line 4—4 in FIG. 1;

FIG. 5 is a detail view, enlarged, of the box latch; and

FIG. 6 is an rear end view of the apparatus.

DESCRIPTION OF THE PREFERRED EMBODIMENTS

With reference now to the drawings in detail, in FIGS. 1, 2 and 6 the apparatus is shown at 10 defining a rabbit enclosure E and comprises a box portion 12 formed of a bottom wall 14 and a pair of upright sidewalls 16, 18 which are suitably integral with the bottom wall and preferably formed of the same sheet of metal, e.g. stainless steel, and with one or more corner edge upsets 19 see FIG. 4.

Sidewalls 16, 18 have their front edges 20, 22 raked rearwardly as shown. A front wall 24 is secured to the raked edges 20, 22 e.g. by welding with the front wall flange portions 26 overlapping the sidewall edges.

A top wall 28 is provided mounted by piano hinge 30 at the upper edge of the sidewall 16. Top wall 28 has a downwardly turned flange 32 at its edge margin 34 opposite piano hinge 30. A latch 41 detailed in FIG. 5, is secured to the top wall 28 rearwardly adjacent the flange 32 by lock 33 and includes a male element in the form of sleeve-shaped pin 42 apertured at 44 to allow slight projection of balls 46. Pin 42 is mounted in annular knob 46 having finger grip flange 48. A central bore 49 in knob 46 communicates with open interior 50 of the pin 42. An actuator button 52 having an extension 54 terminating in boss 56 is movable relative to knob 46 and pin 42 to selectively engage sloped shoulder 58 of the boss 56 with balls 46, effecting accordingly the detenting of the latch 41 at the female latch element 60, comprising a flange 62 defining pin hole 64, to correspondingly lock the top wall 28 down against e.g. the force of a contained rabbit or to hold the top wall 28 closed but ready for easy rabbit insertion into the box 10.

Front wall 24 and top wall 28 are oppositely relieved at 36, 38 respectively to define a rabbit neck receiving opening 40. As a particular feature of the invention, best shown in FIGS. 1 and 2, the single sheet metal thickness from which the top and front walls 24, 28 are made are rounded and cushioned at neck opening 40 by forming tubing 66 into a bead 68 about the edge 70 of the opening. This will prevent injury, particularly to the spinal cord of the rabbit under restraint. As a further feature, also shown in FIG. 3, a removable collar insert 72, suitably of elastomeric natural or synthetic rubber and shaped to clamp about bead 62 is provided. In addition to the cushioning effect, using or not using the collar insert 72 effects a size change in the neck opening to securely accommodate, as needed, larger or smaller rabbits.

The signal feature of the present box invention is the adjustable back plate generally indicated at 74. Back plate 74 comprises a transverse bar 76 and a three-sided frame 78 carrying the bar in doubly adjustable relation. This frame 78 includes bottom wall 80, and integral side walls 82 which are shaped to have the frame in cross-section congruent with the box portion 14. Longitudinal horizontal slots 84 form mounts for securing the frame 78 to the threaded bolts 86 carrying butterfly fasteners 88. The frame 78 is slidable relative to the box portion 14 to correspondingly vary the length of the enclosure E which houses the rabbit, (See FIGS. 2 and 6) and securable in its adjusted relation by tightening fasteners 88.

A further feature of the back plate 74 is the adjustment of bar 76. Bar 76 has a base 90 and oppositely spaced ears 92 which carry threaded bolts 94. The frame 78 has vertical slots 81 in each of the sidewalls 82 which receive bolts 94. Fasteners 96 are adjustable on bolts 94 to secure the bar 76 in place. Accordingly, bar 76 can be raised or lowered relative to frame bottom wall 80, a significant feature in maintaining box cleanliness since feces can be readily flushed under the raised bar, and the bar can be pivoted in or out or to an in-between position effectively quickly changing the enclosure E length by a factor proportioned to the size of the bar ears 92. Cf. the full lines and phantom lines in FIG. 2.

The positioning of the bar 76 at the rear of enclosure E provides a secure resting place for the rabbit. Rabbits, it has been noted, are relatively more quiescent when their hind leg feet are supported in this manner.

The bar 76 may be provided with a central aperture 100 through which an anal thermometer may be passed; the effective restraint of the rabbit provided by the present box enables this facilitation of pyrogen testing.

In addition to its enumerated functional features, the present rabbit box is readily used when ranged in batteries on a rack since the top opening and closure are handled entirely from above, for insertion and removal of rabbits, and flushing rearwardly with the box in place is easily accomplished.

I claim:

1. Rabbit box apparatus for laboratory rabbits, comprising a box having: a bottom wall; a pair of opposed side walls; and a front wall having a rabbit neck-receiving opening, said front wall being connected to said bottom and side walls to define a rabbit enclosure; a top wall hinged to one of said side walls to open or close said enclosure in rabbit receiving and restraining relation respectively; and box back plate means for engaging the hind leg feet of a rabbit restrained in said box, said back plate means including a bar extending transversely of said enclosure opposite said front wall, said box back plate means further comprising a three-sided frame longitudinally interfitting said box bottom and side walls, and including also fasteners securing said frame to said box walls in back plate bar positioning and enclosure extension-delimiting relation.

2. Rabbit restraining box apparatus according to claim 1, in which said frame is adjustable relative to said fasteners for selectively repositioning said frame in rabbit enclosure longitudinal dimension-defining relation.

3. Rabbit restraining box according to claim 2, in which said transverse bar is adjustably carried by said frame.

4. Rabbit restraining box apparatus according to claim 3, in which said transverse bar comprises a U-shaped member having a base and ears upstanding on opposite ends of said base, said frame having bar mounting means opposite said ears, and including also adjustable fasteners cooperating with said mounting means to secure said bar to said frame in adjustable relation.

5. Rabbit restraining box apparatus according to claim 4, in which said bar is alternately positionable within said frame by pivoting about the locus of said fasteners.

6. Rabbit restraining box apparatus according to claim 5, in which said mounting means comprise vertically extended slots in which said fasteners are variably positionable in bar raising and lowering relation relative to said frame.

7. Rabbit restraining box apparatus according to claim 6 in which said top wall and said front wall are oppositely relieved to cooperatively define said neck-receiving opening.

8. Rabbit restraining box apparatus according to claim 7 in which said front wall is fabricated of a single thickness of rigid metal about said neck opening, and including also a rounded bead formed on an edge of said opening for protection against rabbit injury.

9. Rabbit restraining box apparatus according to claim 8 including an elastomeric collar insert separably securable to said bead in opening size-reducing relation.

10. Rabbit restraining box according to claim 7, in which said top wall and said front wall are fabricated of a single thickness of rigid metal, and including a rounded bead extending about the perimeter of said opening, said bead being adapted to mount an elastomeric collar insert in separably securable relation to reduce the size of said opening.

11. Rabbit restraining box apparatus according to claim 10 including also latch means for selectively securing said top wall to the other said side walls.

12. Rabbit restraining box apparatus according to claim 11, in which said latch means comprises a keeper pin-hole carried on one of said side walls, and a latch pin carried by the top wall in keeper-interfitting relation, said latch pin carrying detent means for selectively locking or not locking said top wall to said one side wall in pin and pin-hole registered condition.

13. Rabbit restraining box apparatus according to claim 12, in which said detent means comprises a ball movably carried within said pin, and a ball actuator button carried by said pin in detent ball-controlling relation.

14. Rabbit restraining apparatus according to claim 13 in which said transverse bar has a thermometer-passing aperture formed centrally thereof for connection of the thermometer into a rabbit's rectum during restraint of the rabbit in said apparatus.

15. Rabbit restraining apparatus for laboratory animals, said apparatus comprising a box and an adjustably interfitting frame defining a longitudinally variable rabbit enclosure; said box being formed of sheet metal shaped to define a bottom and an integral pair of opposed upstanding side walls having raked leading edges; said box further having: a front wall secured to said bottom wall and to said side walls along said raked edged thereof; a top wall; said top wall and said front wall being cooperatively relieved to define a rabbit neck-receiving opening; rounded means lining said opening and including a metal bead enclosing the opening edges on both sides thereof; said top wall being hinged along one longitudinal side margin to one of said side walls, said top wall having a downwardly directed flange at the other of its longitudinal side margins to interfit the opposite box side wall; latch means including a male latch element having a movable button and detent ball actuable by said button, said male latch element being carried on said top wall inwardly adjacent said top wall flange, and a female latch element supported by said opposite side wall registrable with said male latch element and adapted to receive said male latch element in detented locked or detented unlocked relation responsive to detent ball actuation by said movable button; said frame being formed of sheet metal into bottom and side walls; said frame side walls and said box side walls carrying cooperating pin and slot means for guided longitudinal adjustment of said frame and box; fasteners securing the relative adjustment of said frame and box, said frame side walls having vertical slots beyond said box, and a transverse bar mounted on said frame sidewalls at said vertical slots; fastening means securing said bar to said frame side walls in vertically adjusted relation, said bar being pivotable in its vertically adjusted relation to delimit the longitudinal extent of said rabbit enclosure independent of the frame adjustment relative to the box.

16. Rabbit restraining apparatus according to claim 15, in which said box has longitudinally spaced upsets at the corner intersection of the box bottom wall and box side walls, to rigidify said box.

* * * * *